(12) United States Patent
Nelson et al.

(10) Patent No.: US 7,020,565 B2
(45) Date of Patent: Mar. 28, 2006

(54) SIGNAL ANALYZER WITH SIGNAL CONDITIONERS

(75) Inventors: Thomas E. Nelson, Knoxville, TN (US); Michael D. Rich, Powell, TN (US); Vern W. Lowry, II, Knoxville, TN (US); Arthur R. Crawford, West Jefferson, OH (US); Robert Skeirik, Knoxville, TN (US)

(73) Assignee: CSI Technology, Inc., Wilmington, DE (US)

( * ) Notice: Subject to any disclaimer, the term of this patent is extended or adjusted under 35 U.S.C. 154(b) by 6 days.

(21) Appl. No.: 10/797,268

(22) Filed: Mar. 10, 2004

(65) Prior Publication Data

US 2004/0236525 A1 Nov. 25, 2004

Related U.S. Application Data

(60) Provisional application No. 60/453,681, filed on Mar. 11, 2003.

(51) Int. Cl.
*G01F 17/00* (2006.01)

(52) U.S. Cl. .......................................... 702/56; 700/95

(58) Field of Classification Search ................ 702/56, 702/83, 183; 700/95; 73/593
See application file for complete search history.

(56) References Cited

U.S. PATENT DOCUMENTS

| | | | |
|---|---|---|---|
| 5,544,073 A | 8/1996 | Piety et al. | |
| 5,633,811 A | 5/1997 | Canada et al. | |
| 5,646,350 A | 7/1997 | Robinson et al. | |
| 5,691,924 A | 11/1997 | Czyzewski et al. | |
| 5,895,857 A | 4/1999 | Robinson et al. | |
| 5,943,634 A | 8/1999 | Piety et al. | |
| 5,965,819 A | 10/1999 | Piety et al. | |
| 5,980,094 A | 11/1999 | Nower | |
| 6,507,765 B1* | 1/2003 | Hopkins et al. | 700/95 |
| 6,549,869 B1 | 4/2003 | Piety et al. | |
| 2002/0052714 A1* | 5/2002 | Qian et al. | 702/183 |
| 2003/0065482 A1* | 4/2003 | Bechhoefer | 702/183 |
| 2003/0106375 A1* | 6/2003 | Sabini et al. | 73/593 |

OTHER PUBLICATIONS

CSI Technology, Inc. Vibration Analysis Website, "http://www.compsys.com/technology/vibe.html," specifically under "Product Listings"→"3.2.2 Route-Based Data Collectors/Analysers".

* cited by examiner

Primary Examiner—Michael Nghiem
Assistant Examiner—Xiuqin Sun
(74) Attorney, Agent, or Firm—Luedeka, Neely & Graham, P.C.

(57) ABSTRACT

The present invention is an apparatus for detecting machine parameters including vibration, producing signal corresponding to the parameters and conditioning the signals by means of predetermined criteria such as amplitude and time criteria. Routes may be input to the analyzer with settings that govern part of the conditioning for individual machines. The predetermined criteria also may include an input limit criterion which ensures the safety of the analyzer circuitry by indicating attenuation levels for incoming signals. The analyzer is also capable of two channel analysis of input signals including a summing analysis. The analyzer has thumb operated controls for easy operation in harsh environments.

22 Claims, 6 Drawing Sheets

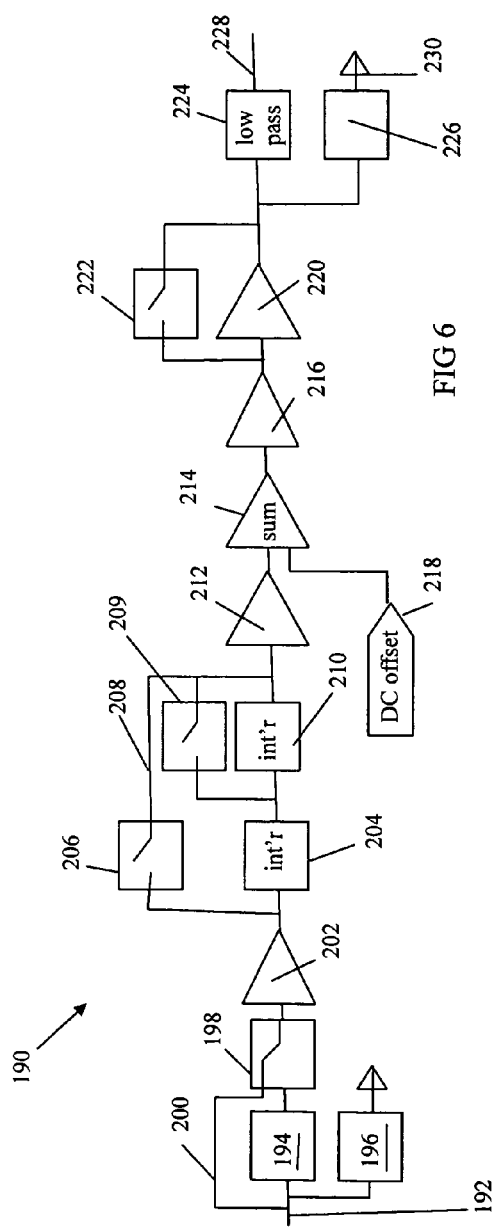
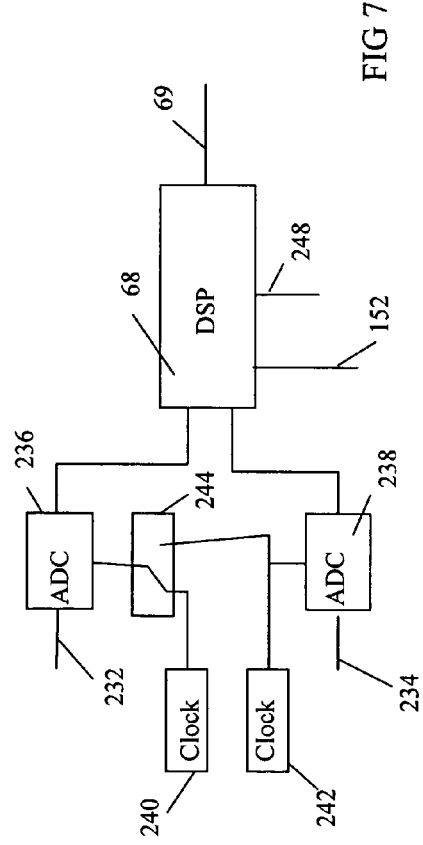

SIGNAL ANALYZER WITH SIGNAL CONDITIONERS

CROSS REFERENCE TO RELATED APPLICATIONS

This application claims priority to provisional application No. 60/453,681 filed Mar. 11, 2003.

FIELD OF THE INVENTION

This invention pertains to a hand-held analyzer for detecting and analyzing machine parameters including parameters such as vibration, and particularly relates to an analyzer that produces and conditions parameter signals to increase accuracy of the parameter signals or to increase accuracy and reliability of the analysis of the parameter signals.

BACKGROUND OF THE INVENTION

Analyzers for analyzing machine parameters are used in the predictive maintenance industry to determine the health of machinery. For example, an analyzer may process vibration signals from a machine to determine mechanical conditions of the machine, such as a worn or cracked bearing race. As another example, the flux produced by an electric machine may be analyzed to determine the health of windings in the machine. While such analyzers are typically sophisticated in the types of analytical operations they perform, they are still subject to errors due to faulty interpretation of noisy signals. For example, a noisy tachometer signal might fool an analyzer, or an unexpectedly large input signal may cause errors or even failures in some analyzers. The present invention includes features to improve accuracy, stability, fault resistance and reliability in noisy and harsh industrial environments, and includes further features that improve the analytical capabilities and speed of the analyzer.

SUMMARY

The present invention provides an apparatus for efficiently identifying and analyzing concerns possibly requiring maintenance for various types of machines such as motors, pumps, fans, presses, drive trains, gear boxes, etc. It allows for complex analysis, including summation, of multiple signals representing machine characteristics through dual channels, and provides the opportunity for economy, time savings and safety through preprogrammed routes which allow the apparatus to set predetermined settings based on the machine which is next to be analyzed. The analyzer attenuation circuitry that is set or preset to optimize performance and speed and to increase instrument stability and resistance to failure.

In accordance with one aspect of the present invention, an analyzer is provided for monitoring a machine. A user input interface receives and transmits a user input, and an analog input receives a raw analog input signal. A conditioning circuit receives the raw analog signal and produces a conditioned analog signal based on predetermined criteria such as an input limit. In accordance with one embodiment, the conditioning circuit includes an attenuator circuit that attenuates the raw analog signal if its magnitude is too large as compared to the input limit. A data processor receives and responds to the user input to control the analyzer. For example, the data processor controls the attenuation circuit based on the predetermined criteria and performs analysis of the conditioned analog signal. An output produces an output signal corresponding to the conditioned analog signal.

In accordance with another aspect of the invention, the analog input include at least a tachometer input for receiving a raw tachometer signal having a magnitude and having a plurality of pulses with a cycle time corresponding to a speed of the machine. The conditioning circuit includes at least a qualifying circuit connected to the tachometer input for receiving and processing the raw tachometer signal and producing a qualified tachometer signal when the raw tachometer signal is qualified based on predetermined criteria. The output for produces an output signal corresponding in part to the qualified tachometer signal.

The conditioning circuit may include an amplifier gain circuit that amplifies the raw analog signal based on a preset gain stored in a memory. The user input may include a route that includes information relating to a group of machines to be analyzed. Each of the machines in the route is correlated to machine-specific preset gains which are stored in the memory. The user is prompted by the analyzer to take measurements from a particular machine, and when user inputs indicate that a machine in the route is or will be connected, the preset gains for that particular machine are taken from the route and used to set the amplifier gain.

In accordance with another aspect of the analyzer, the analyzer may include a second analog input and a second conditioning circuit. The second analog input receives a second raw analog signal, and the second conditioning circuit functions just as the first conditioning circuit functioned as described above; it processes the second raw analog signal and produces a second conditioned analog signal based on a second predetermined set of criteria. The second predetermined criteria include a second input limit just as the original predetermined criteria. A second selectable attenuator circuit is controlled by the data processor's implementation of the second predetermined criteria. The output in this embodiment produces an output signal based on both the conditioned analog signal and the second conditioned analog signal. In another embodiment of the analyzer, including the dual channel configuration described above, the analyzer further includes a summing circuit that produces a summation signal representing the addition of the conditioned analog signal and the second conditioned analog signal. The output signal may also be based on the summation signal.

The housing of the analyzer may include a user input interface with a plurality of buttons. The housing has a left gripping surface and a right gripping surface situated such that some of the buttons are thumb accessible when the analyzer is held by a user with the user's palms engaging the left and right gripping surfaces.

In the preferred embodiment of the analyzer, the analyzer includes a smart tachometer circuit, attenuation circuits, amplifier circuits, dual channels, summation capabilities, and thumb control.

BRIEF DESCRIPTION OF THE DRAWINGS

The foregoing, as well as other objects of the present invention will be further apparent from the following detailed description of the preferred embodiment of the present invention, when taken together with the accompanying specifications and drawings, in which:

FIG. 6 is a circuit diagram representing one of the two amplification portions of the invention which amplifies the signal to various levels based on the position of four switches in accordance with the present invention.

FIG. 7 is a circuit diagram representing two clocks for providing timing signals to two analog to digital converters for converting two signals into digital signals which may be analyzed by the digital signal processor in accordance with the present invention.

DETAILED DESCRIPTION

Figure 1:
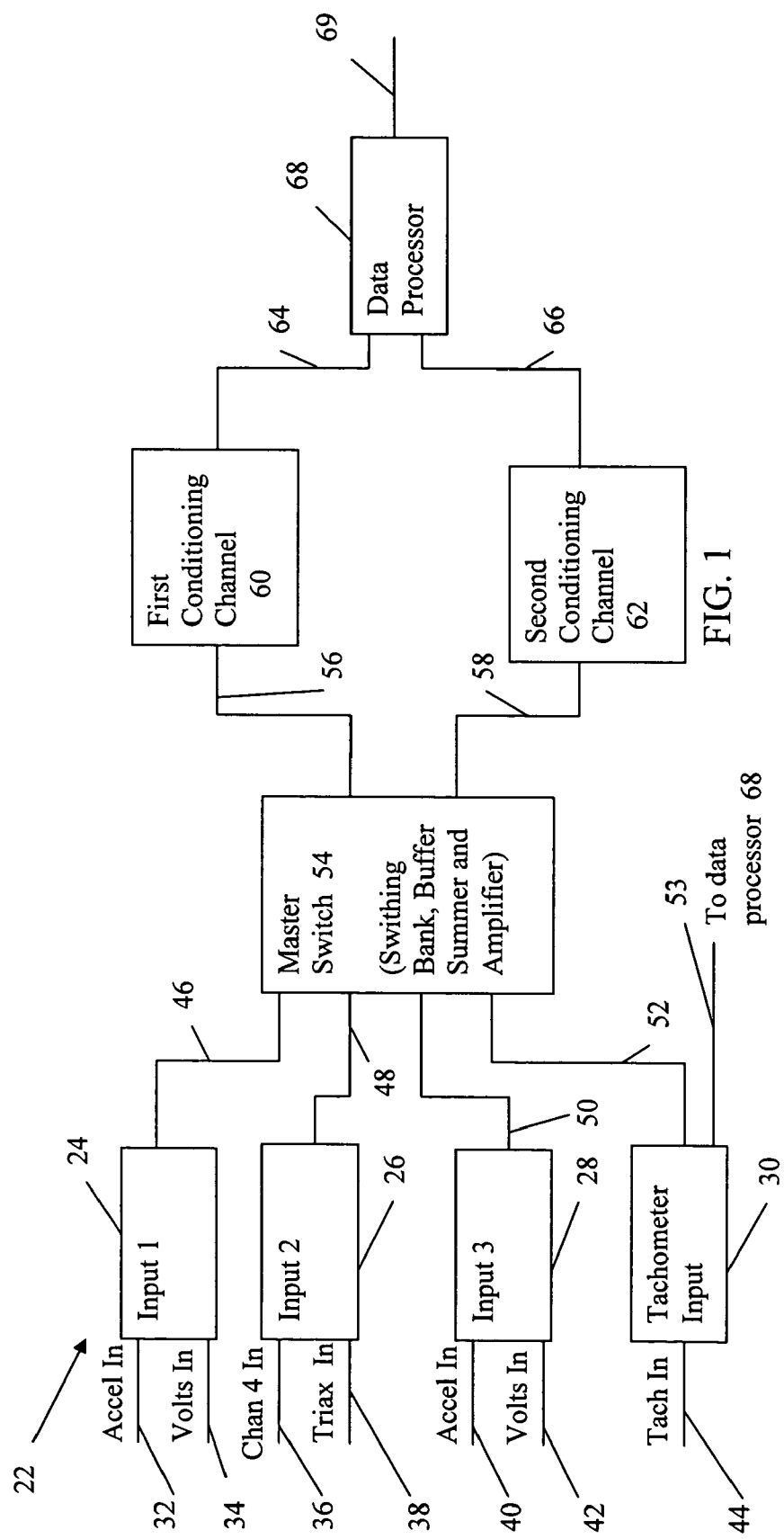
FIG. 1 is a block diagram representing the input, switching, conditioning channels, and data processor stages of the circuit constructed in accordance with the present invention.

The present invention relates primarily a method and structure for performing various functions in a data analyzer, such as a vibration data analyzer. To best understand the invention, an overview of the invention is provided followed by a more detailed discussion.

Referring now to the figures in which like reference characters designate like or corresponding parts throughout the several views, a block diagram is shown in figure one illustrating the input system 22 for a data analyzer, such as a vibration data analyzer. The system 22 includes a first input preconditioning circuit 24 configured to receive an accelerometer signal through the acceleration input 32 or an independently powered input signal through the volts input 34. The accelerometer input 32 provides power to a sensor such as an accelerometer, whereas the volts input is a passive input that receives an input signal but does not power it.

A second input preconditioning circuit 26 includes a triaxial input 38 and a fourth channel input 36. The triaxial input 38 is adapted for connecting to a triaxial sensor such as a triaxial accelerometer that produces a sensor signal corresponding to acceleration in the three different directions, such as X, Y, and Z directions. The fourth channel input 36 receives a signal corresponding to a fourth parameter in addition to the signals corresponding to the three different directions. For example, the fourth channel input 36 may receive a torque vibration signal, or a signal corresponding to linear vibration at a different measurement location, other than the location of the triaxial sensor. As shown in this preferred embodiment, the fourth channel input 36 is a powered input that may be used to power and receive a signal from an accelerometer. Certain types of balancing techniques require the use of four accelerometers and, thus, having a fourth accelerometer input provides the ability to perform this type of balancing technique, as well as other analyzing techniques requiring four powered inputs.

A third input preconditioning circuit 28 is provided to power and receive a sensor signal, such as an accelerometer signal, on an accelerometer input 40, and is configured to receive another self powered sensor signal on the volts input 42. Preconditioning circuit 28 is identical to preconditioning circuit 24. A tachometer input preconditioning circuit 30 is also provided and is configured to receive a tachometer sensor signal on the tachometer input 44.

The signals may be provided to the preconditioning of circuits 24, 26, 28 and 30 through a variety of connectors, preferably a plug system whereby various sensors are plugged into sockets associated with the preconditioning circuits. Each individual preconditioning circuit may be associated with more than one socket, or a single socket may be configured to provide input signals to more than one preconditioning circuit or all of the preconditioning circuits.

The preconditioning circuits 24, 26, 28 and 30 are connected by lines 46, 48, 50 and 52 to a master switch 54 that performs switching, buffering, summing and amplifying functions. It will be understood that a single line may represent multiple lines as required for a particular circuit. For example line 48 represents multiple lines so that the inputs appearing on lines 36 and 38 may both be supplied to the master switch 54. Signals that are applied to the master switch 54 are conditioned and then supplied through lines 56 and 58 to first and second conditioning channels 60 and 62. The conditioning channels 60 and 62 may amplify, demodulate, envelope, integrate, etc. the received signals as desired by the user and provide conditioned output signals on lines 64 and 66 to a data processor 68, that is preferably a digital signal processor, and is most preferably a data processor having a model number DSP56301 manufactured by Motorola. The output of the data processor 68 is provided on line 69, which is preferably a parallel bus.

Figure 2:
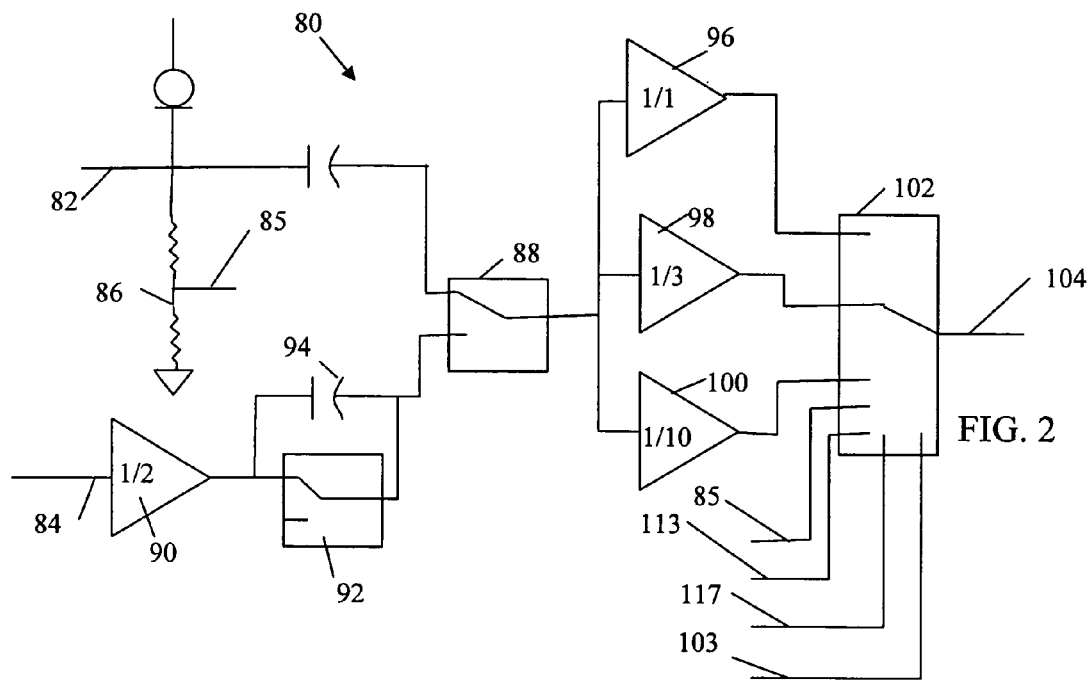
FIG. 2 is a circuit diagram representing both the first and third identical preconditioning circuits and illustrating the input of accelerometer signals and attenuation and switching circuitry constructed in accordance with the present invention.

Referring now to FIG. 2, a preconditioning circuit 80 is shown that corresponds to both preconditioning circuits 24 and 28. Input line 82 corresponds to the acceleration inputs 32 and 40 shown in figure one. While input line 82 is represented by a single line in this figure, it will be understood to represent one or more lines as needed for a particular accelerometer or other sensor. The input signal on line 82 is provided to a resistor divider 86 which places the input signal on a raw input line 85 which connects the input signal directly to the switch 102 shown in figure two. The input signal on line 82 is also applied through switch 88 to a parallel set of attenuators 96, 98 and 100 that attenuate the signal by a factor of one, one third, and one tenth, respectively. Each of the attenuators 96, 98 and 100 have an output applied to a switch 102. The switch 102 may connect output 104 to one of the attenuators and 96, 98 and 100 or to lines 85, 113, 117 and 103. The signal appearing on line 85 is the raw accelerometer input signal after it has been attenuated by the resistor divider 86. The signals appearing on lines 113 and 117 are described hereafter. Line 103 is connected to receive the signal from the third input preconditioning circuit 28.

With continuing reference to FIG. 2, a second input line 84 corresponds to the voltage input 34. The signal appearing on line 84 passes through an attenuator 90 that attenuates the signal by a factor of one half and applies its output to a switch 92. The attenuator 90 also functions as a buffer to provide a high impedance input to avoid having any adverse affect on the circuit or a device that is providing the input signal. When the switch 92 is in the position shown in FIG. 2, it applies a DC coupled signal directly to the switch 88. When the switch 92 is turned off, an AC coupled signal is applied through capacitor 94 to the input of switch 88. The data processor 68 controls the position of when and 88 so that it can select either a DC or an AC coupled input signal from line 84.

From the above, it is appreciated that the data processor 68 may select attenuated versions of the signals appearing on lines 82 and 84, or the raw signals appearing on lines 85, 113, or 117 by controlling the switches 102, 88 and 92.

Figure 3:
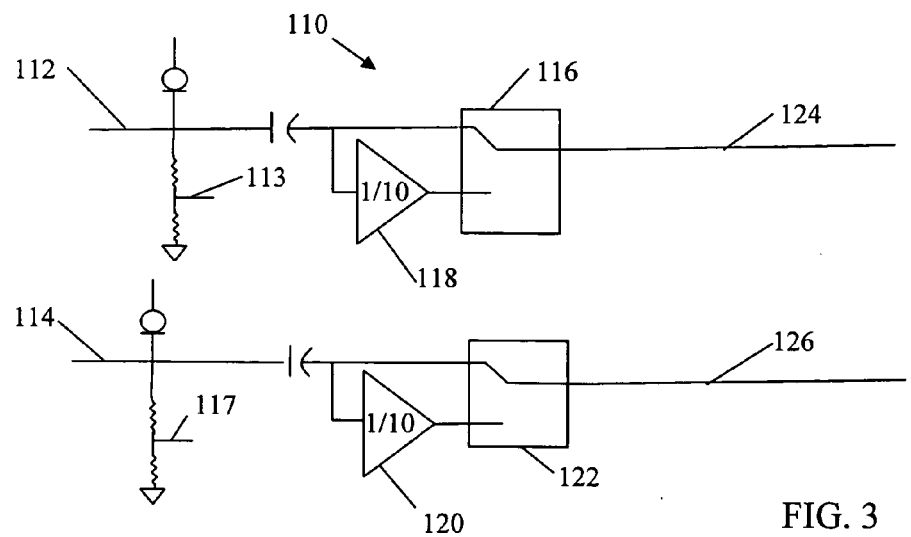
FIG. 3 is a circuit diagram representing the second preconditioning circuit and illustrating the input of a fourth channel input for various signals and a triaxial input and attenuation and switching circuitry constructed in accordance with the present invention.

Referring to FIG. 3, the circuit 110 is a more detailed block diagram of the second input preconditioning circuit 26. Line 112 corresponds to the fourth channel input 36 and line 114 corresponds to the triaxial input 38. The signal on line 112 is applied through a resistor divider and appears on line 113, which is connected to the switch 102 previously described. This signal is also applied through a capacitor to the inputs of a switch 116 and attenuator 118. When the switch 116 is in the position shown in FIG. 3, an AC coupled signal appears on line 124 without attenuation and is further applied to the circuits. When the switch 116 is connected to the output of attenuator 118, the input signal from line 112 is attenuated by a factor of ten, and the attenuated signal appears on line 124. The triaxial signal appearing on line 114 is applied through a capacitor to an attenuator 120 and a switch 122, which correspond to the attenuator 118 and switch 116 discussed above. Thus, line 126 receives either an AC coupled triaxial signal from line 114 or it receives the same signal attenuated by a factor of ten.

Figure 4:
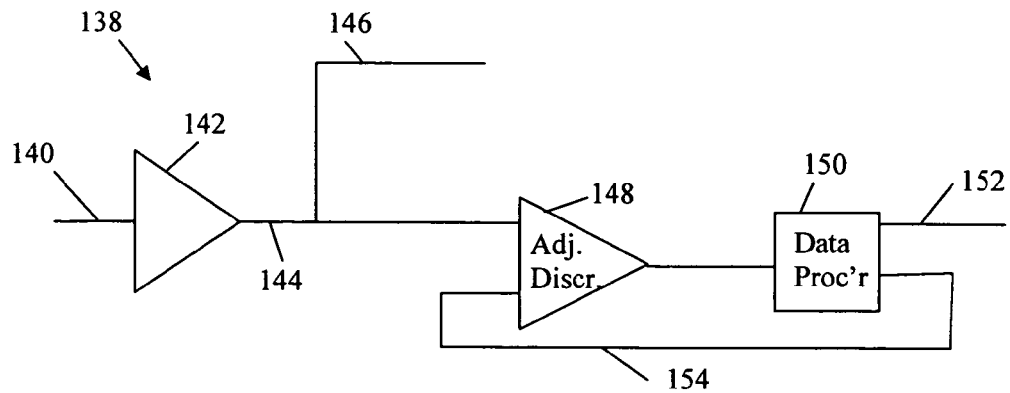
FIG. 4 is a circuit diagram representing the tachometer input circuit and illustrating the input of tachometer and the qualifying mechanism and control constructed in accordance with the present invention.

A tachometer input circuit 138 is shown in FIG. 4, and a tachometer signal is applied on the input line 140 that is connected to a high impedance input provided by an adjustable gain stage 142. The output of stage 142 is applied through line 144 to an adjustable discriminator 148 and through line 146 it supplies a raw tachometer signal to other parts of the circuit. The output of the adjustable discriminator 148 is applied to a tachometer data processor 150 that controls the operation of the adjustable discriminator 148. The data processor 150 is connected by line 152 to the data processor 68. Preferably line 152 is a serial data bus enabling communications to and from the data processor 68. As will be described hereinafter in greater detail, the data processor 150 controls the adjustable discriminator 148 to set thresholds and conditions that determine when and if a tachometer pulse is detected and reported to the data processor 68.

Figure 5:
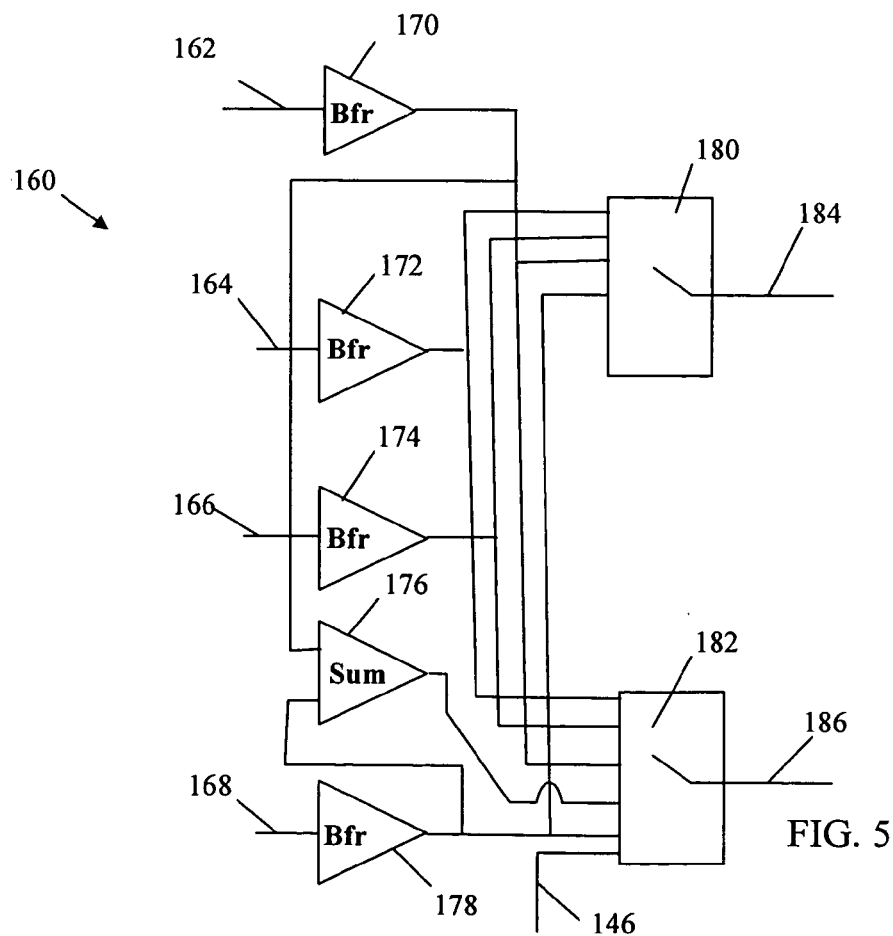
FIG. 5 is a circuit diagram representing the summation and switching circuits which switch among various signals to provide the means for various types of analysis constructed in accordance with the present invention.

The circuits described in FIGS. 2–4 provide inputs to the master switch 160. The output of circuit 80 (FIG. 2) appears on line 104 which is connected to line 162 (FIG. 5). Likewise, referring to FIG. 3, the outputs on lines 124 and 126 are applied to lines 164 and 166 in FIG. 5. Line 168 is connected to receive the output from the third input circuit 28, which is identical to the circuit 80 described in relation to FIG. 2. Line 146 appears in both FIGS. 4 and 5 and shows the connection between the tachometer input circuit 138 and switch 182 (part of the master switch 54).

The input lines 162–168 are applied to the input of buffers 170, 172, 174, 178, whose output is applied through a parallel connection to both switches 180 and 182. The switches 180 and 182 may connect to any of the input signals produced by the circuits described in FIGS. 1–4. In addition, switch 182 may connect to line 146 that carries the raw buffered tachometer signal. The output lines 184 and 186 in FIG. 5 correspond to the output lines 56 and 58 shown in figure one, and each of the output lines carries one of the input signals to the switches 180 and 182.

The output lines 184 and 186 are connected to the first and second conditioning channels 60 and 62. Each of conditioning channels 60 and 62 are identical to the circuit 190 shown in FIG. 6. Line 192 in FIG. 6 represents either of the lines 184 and 186. The input line 192 is connected to a high pass filter 194 and an overload detect circuit 196. If an overload is detected by circuit 196, an overload indication is provided to the data processor 68 by communication lines that are not shown. The output of the high pass filter 194 is connected to a switch 198 that is controlled by the data processor 68. The switch 198 connects either to the output of the high pass filter 194 or connects to a line 200 that bypasses the high pass filter 194. Thus, the switch 198 operating under the control of the data processor 68 is connected to either a filtered or and unfiltered input signal.

The output of switch 198 is applied through an amplifier 202 having a gain of one and functioning primarily as a buffer. The output of amplifier 202 is applied to the input of an integrator 204 and a switch 206. The output of the integrator 204 is applied to the input of an integrator 212 or the input of switch 209. The outputs of switch 206, switch 209, and integrator 210 are applied to a single input of an amplifier 212 having a gain of one and functioning as a buffer.

The data processor 68 controls the operation of switches 206 and 209 such that the input signal is either not integrated, or is integrated once, or is integrated twice. When an accelerometer signal is provided as an input, the signal that is not integrated represents an acceleration. The signal that is integrated once represents a velocity and the signal that is integrated twice represents displacement or distance. The output of the amplifier 212 is provided to a summer 214 whose other input is connected to a DC offset circuit 218. The circuit 218 provides a signal that subtracts any DC component from the signal appearing at the output of the amplifier 212. Again, the DC offset circuit 218 communicates with and is controlled by the data processor 68.

The output of the summer 214 is applied to a variable amplifier 216, whose gain is controlled by the data processor 68. The output of amplifier 216 is applied to the inputs of amplifier 220 having a gain of twelve and a switch 222 that bypasses the amplifier 220. The outputs of the parallel amplifier 220 and switch 222 are applied to the input of a low pass filter 224 and another overload detect circuit 226. When the switch 222 is in the "Off" position as shown in FIG. 6, gain on amp 240 is set to 12. If the switch 222 is switched "On", amplifier 220 gain is set to 1. The gain of the amplifier 220 and the position of switch 222 is controlled by the data processor 68. The overload detect circuit 226 determines whether the signal appearing at the input of the low pass filter 224 exceeds a threshold indicating improper operation of the circuit. If the threshold is exceeded, the detector circuit 226 reports the malfunction to the data processor 68.

Referring again to FIGS. 1, 6 and 7 there are first and second conditioning channels 60 and 62, each being identical to the circuit 190 shown in FIG. 6. The output of the first conditioning channel 60 (line 64 in FIG. 1 and line 228 in FIG. 6) is applied through line 232 to an analog to digital converter, ADC 236. The output of the second conditioning circuit 62 (line at 66 in figure one and line 228 in the FIG. 6) is applied through line 234 to the ADC 238. The ADC 236 which is part of the first conditioning channel 60 receives a clock signal through switch 244 that is connected to either a first clock 240 or a second clock 242. The second clock 242 is always applied to the ADC 238. Thus, the ADCs 236 and 238 receive either the same clock signal or different clock signals depending upon the position of the switch 244 which is controlled by the data processor 68.

The data processor's 68 is also connected through line 152 (preferably a data bus) to communicate with the tachometer processor 150. Thus the data processor 68 receives a tachometer signal that has already been processed by the processor 150 to improve reliability.

Figure 8:
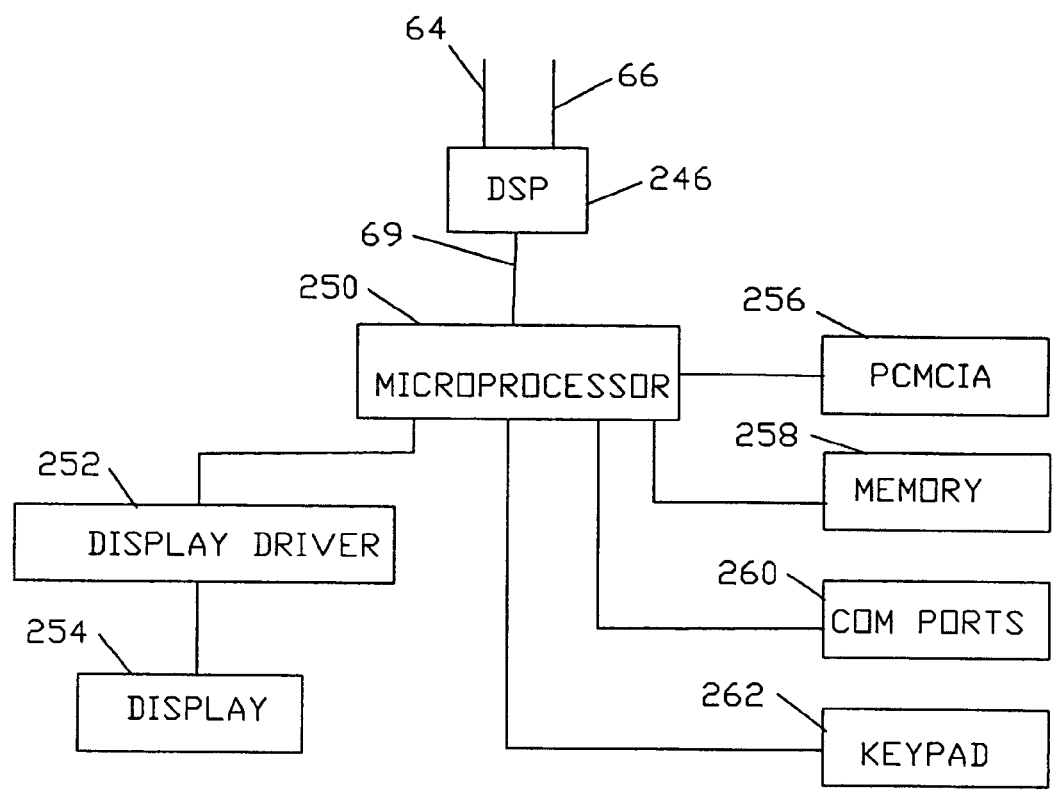
FIG. 8 is a flow chart representing the relationship among the processors, the input and output devices, and the memory storage devices in accordance with the present invention.

Referring now to FIG. 8, an overview of the analyzer 245 of the invention is shown. The data processor 68 is connected through line 69 (a data bus) to a data processor 250, preferably a 32 bit microprocessor. In the preferred embodiment, the data processor 68 substantially simultaneously processes the signals produced by the first and second conditioning channels 60 and 62. Each of the ADCs 236 and 238 are preferably Sigma Delta converters manufactured by Analog Devices and have a maximum output rate of 234375 samples per second (3750000 bits per second), but as configured in this particular circuit the ADCs produce a maximum output bit rate of 3276800 bits per second (204800 samples per second). The data processor has the capacity to receive and simultaneously process two signals each having a bit rate of 3276800 bits per second (204800 samples per second). Because of the speed of the data processor 68, it is performing substantially parallel processing of the two signals appearing on lines 64 and 66, even though portions of each signal are being processed sequentially (serially) by the data processor 68. By the use of memory, such as buffers, the data processor 68 is capable of operating on two signals sequentially to achieve parallel processing of the two signals.

After the input signals have been processed by the data processor 68, the processed signals are provided through line 69 to the microprocessor 250. Memory 258, preferably both RAM and ROM, is connected to the microprocessor 250, and additional memory is provided by a PCMCIA card 256 that is also connected to the microprocessor 250. For providing communication to outside computers, communications ports 260 are interfaced with the microprocessor 250 and may include parallel and serial communications ports, such as an RS-232 Port, or a USB port. Commands and other instructions are input through a keypad 262 that is interfaced with the microprocessor 250, and information is provided to a user by the microprocessor 250 issuing display signals that are applied to a display driver 252 producing images on the display 254.

Operation

Referring to FIG. 8, the operation of the instrument is initiated by depressing a power button on the keypad 262. Then, operation of the instrument is controlled by the user inputing instructions through the keypad 262. The microprocessor 250 responds to the user inputs by providing information back to the user through display 254. In addition, the microprocessor 250 sends commands to the data processor 68 instructing it to receive and process signals as required by the user. Typically, one or more information signals (input signals) are received by the data processor 68 and processed. For example, the data processor 68 may receive two acceleration signal inputs corresponding to measured vibration and a tachometer signal input corresponding to rotation of a machine. The acceleration signal inputs are typically processed by the circuit 190, such as by integrating the acceleration signal once or twice to produce velocity or displacement signals. Also, the data processor may perform transform functions on the signals, such as Fourier transform functions.

Referring to FIG. 4, an intelligent tachometer input circuit 138 is illustrated. Included is a data processor 150 operating under the control of the data processor 68. The data processor 150 sets and maintains conditions for qualifying a signal as a proper tachometer pulse. Often the tachometer signals are dirty, meaning they have a number of noise attributes that may fool a simple circuit into believing that a tachometer pulse represents multiple pulses or no pulses. To combat this problem, the data processor 150 under the control of the data processor 68 sets a threshold amplitude for a qualified tachometer pulse.

The threshold amplitude is set in different ways. In a manual mode, the threshold amplitude is set by the user. In response to instructions from the user, the tachometer signal is displayed and frozen for the user on display 254. The user then inputs a threshold amplitude based on the frozen tachometer signals shown on the display. Typically, a user will select an amplitude that is well above the noise floor, but well below the peak amplitude of the tachometer pulse.

In an automatic mode, the data processor 150 automatically sets the tachometer threshold by determining the peak amplitude of the input signal over a predetermined period of time and sets the threshold at a percentage of the average peak amplitude. Preferably, this threshold may be set at 80 percent of the average peak amplitude measured over 10 machine cycles (10 tachometer pulses).

A tachometer pulse may also have multiple pulses within the individual tachometer pulse, and there may be valleys within a single tachometer pulse that fall below a threshold set for the tachometer pulse. Thus, additional conditions are imposed to prevent the system from interpreting a single tachometer pulse as multiple tachometer pulses. One such condition is a time limitation between tachometer pulses. The data processor 150 is programmed to disregard a tachometer pulse that meets the threshold amplitude condition, but occurs within a preset time limit of a previous tachometer pulse.

This time limit may be sent in a number of ways. First, in a manual setting, the user is allowed to input a time limit. The user's input of a time limit is checked against known information programmed into the analyzer. For example, when the analyzer is being used to receive data from a particular machine on a route, the analyzer will know the nominal operating speed of the machine. The nominal operating speed of the machine will be information that is contained within the route is therefore available to the analyzer. Based on that nominal operating speed, the analyzer will make a judgment as to whether the user's input of a time limit is reasonable. Preferably, the data processor 150 will compare the user's time limit to a calculated upper and lower limit. Both of these limits will be calculated as a percentage of a machine cycle, the time required for the machine to rotate once. If operating properly, the tachometer will produce one tachometer pulse per cycle. Thus, the upper limit is calculated as a large percentage of the machine cycle time. For example, the upper limit may be 80 percent of a nominal cycle time. The lower limit is a small percentage of the cycle time, for example 10% of the cycle time. If the user's time limit is greater than the upper limit or less than the lower limit, a warning message is provided to the user, but the user's time limit is followed.

In one automatic mode of operation, the data processor 150 automatically sets the time limit at 50% of one cycle time. To begin operation, data processor 150 sets the time limit at 50% of the nominal cycle time of a machine. Then, as tachometer pulses are detected, an actual cycle time of the machine is calculated, and the time limit is set at a percentage of the actual cycle time of the machine, such as 50% of the actual cycle time. The user also has the option of setting the initial time limit and allowing the data processor 150 to reset the time limit based on the actual measured machine cycle time. The default percentage for the time limit is 50%, but the user may change the percentage used by the data processor to establish the time limit for the tachometer. For example, a user may wish to instruct the microprocessor 250 to set a time limit of 40% of one cycle time. By each of the above described modes of operation, the tachometer processor 150 imposes both a threshold amplitude and a threshold time limit upon a candidate tachometer pulse to qualify it as an actual tachometer pulse. By imposing these conditions, a more reliable tachometer pulse is achieved.

In the specific embodiment shown as an example in FIG. 4, the data processor 150 applies a signal through line 154 to a discriminator 148. The signal on line 154 represents the threshold amplitude that the pulse from the tachometer must exceed. If the tachometer pulse is less than the threshold amplitude on line 154, the discriminator 148 does not generate a pulse at its output even when a pulse is received on the input 144. However, when the pulse on line 144 exceeds the amplitude of the signal on line 154, the adjustable discriminator 148 produces an output that is applied to the data processor 150. The data processor then determines whether a time limit has been met. That is, the data processor 150 determines whether sufficient time has passed since the previous tachometer pulse. If the answer is yes, the data processor 150 will report a tachometer pulse on line 152 to the data processor 68. If desired, both the amplitude threshold and the time limit threshold for the tachometer pulse may be implemented by analog circuitry. Likewise, the data processor 150 could digitally apply both the amplitude threshold and time limit as qualifying conditions. However, it is preferred to apply the amplitude threshold by analog circuitry and apply the time limit by digital circuitry.

Another factor influencing the accuracy of a signal analyzer is the amplitude of the signal received from a sensor. To provide accurate results, prior analyzers have an automatic gain control feature that will adjust the gain of amplifiers in the circuit to accommodate input signals of different amplitudes and thereby maximize the sensitivity and accuracy of the analyzer. However, the automatic gain control feature requires time to analyze the input signals and set the gain of various amplifiers. In the present invention, a route of machines is downloaded into the microprocessor 250. The route identifies a number of machines from which data will be obtained. For each machine on the route, a preset gain is recorded. Thus, when an operator provides input signals through the keypad 262 indicating that a particular machine on a route will be tested, the microprocessor 250 instructs the data processor 68 to set the gains of various amplifiers based on the preset to gain stored in the microprocessor 250 as part of the route. Thus, referring to FIG. 6, the data processor 68 sets the gain of the amplifier 216 and sets the switch 222 either on or off to determine whether amplifier 220 will be included in the circuit. In addition, referring to FIG. 2, the data processor 68 issues signals to the switch 102 to select one of the attenuators 96, 98 and 100, if that particular input circuit 80 is being used. Likewise, switches 116 and 122 are switched to a desired position based on the preset gain and the attenuators 118 and 120 are either selected or excluded from the circuit for the initial measurements.

Once the microprocessor 250 and data processor 68 have preset the gains of the various amplifiers and attenuators, the instrument immediately begins to acquire signals and process the signals according to the preset information in the route for a particular measuring point and a particular machine. As part of that analysis, the input signal will be qualified. That is, the signal will be analyzed to determine whether the signal amplitudes are within a preset range that will produce accurate data. If the input signal qualifies, the data processor 68 will continue to process the data normally. If the input signal does not qualify, the data processor 68 will disregard the input data, discontinue its analysis, and perform an auto ranging function whereby the amplifiers and attenuators are reset to achieve an acceptable or qualified signal that will produce accurate data. If auto ranging is required for a particular point on a particular machine, the new gain settings determined by the auto ranging process will be saved in the route data as the new preset gain for the particular measuring point and machine in question.

Referring again to FIGS. 2 and 3, it is noted that three attenuators 96, 98 and 100 are provided in circuit 80 for the purpose of attenuating large amplitude input signals. One problem associated with signal analyzers is the larger variability of the input signals. Depending upon the sensor, an input signal may be sufficiently large to saturate the instrument and cause inaccurate measurements or damage to the instrument. Thus, in the present invention the input circuits all include optional attenuators in the early stages of the input circuits to maximize efficient and accurate measurements and protect the instrument itself. In circuit 80 of FIG. 2, the voltage input 84 includes an attenuator 90 that is included in every circuit for additional protection against excessively large input signals. In FIG. 3, attenuator 120 is provided for the triaxial input 114 and attenuator 118 is provided for the fourth channel input at line 112. One or more of these attenuators may be selected by the data processor 68 as needed for a particular measuring, a particular machine or a particular sensor.

The two channel operation of the analyzer may best be understood by reference to FIGS. 5, 6 and 7. Referring to FIG. 5, it is appreciated that the input signals appearing on lines 162, 164, 166 and 168 may be applied to either or both of the two channels represented by lines 184 and 186. Thus the same signal or different signals may be applied to lines 184 and 186.

Referring to FIG. 7, it may be appreciated that one channel of operation is represented by ADC 236 and the other channel is represented by ADC 238. The ADC 236 and ADC 238 may receive the same clock signal from clock 242, or clock 242 may be connected only to the ADC 238 and clock 240 may be connected to the ADC 236. Considering the clock arrangement in FIG. 7 and the switching arrangement of FIG. 5, the flexible analysis possible with this circuitry is best appreciated. If the same signal is applied to both channels, it is likely that different analysis of the same signal is required. Thus, different clock signals may be necessary or desirable at ADC 236 and ADC 238. In such case, switch 244 is positioned as shown in FIG. 7 so that ADC 236 receives a clock signal from clock 240. At the same time, ADC 238 receives a different clock signal from clock 242. Thus, under the control of the data processor 68, each ADC may be operated at very different clock speeds. This capability is particularly advantageous for providing fast multiple analysis of the same signal.

On the other hand, in other applications it is important to perform the same analysis on two different signals. In such case, it is desirable to have the same clock signal applied to both ADC 236 and ADC 238. By switching the switch 244 to the opposite position from that shown in FIG. 7, both ADC 236 and ADC 238 are connected to clock 242 and ADC 236 is disconnected from clock 240. Thus, two different input signals may be analyzed with essentially identical input channels. Of course, it is also possible to provide the same clock signal to both channels when identical signals appear on both channels, and it is possible to provide different clock signals to the different channels when the different signals appear in each channel. In short, the switching and clocking circuitry provide a high level of flexibility in the analog input channels. Thus, a single input signal may be processed faster with a two channel operation, or different signals may be processed simultaneously in an identical manner.

Referring again to FIG. 5, a particularly convenient aspect of the invention is illustrated. A summing circuit 176 is connected to the output buffer 178 and is therefore connected to receive an input signal provided on line 168 the other input of the summing circuit 176 is connected to the output of buffer 170 and therefore receives input signal on line 162. Lines 162 and 168 are connected to different input circuits each of which is identical to the circuit 80 illustrated in FIG. 2. Thus, for example, the summing circuit 176 may receive two acceleration signals from the two different accelerometers. The output of the summing circuit 176 is applied to switch 182, and both of the two input signals to the summing circuit 176 are applied to the switch 180. Thus, by appropriately controlling and switching the two switches 180 and 182, the sum of two input signals may be applied to line 186 and either of the two input signals may be applied to line 184. Thus, for example, the signals appearing on lines 162 and 168 may be summed and applied to line 186, and the input signal appearing on line 162 may be applied to line 184.

In the analysis of signals, it is often advantageous to compare the sum of two signals to one of the signals. In known prior art devices, the setup required to perform such analysis is cumbersome. In the analyzer of the present invention, the setup for this type of an analysis is simple and can be automatic. In the preferred embodiment, a route is downloaded into the analyzer, and the route may specify this particular measurement. When this particular measurement is required at a particular measurement point in the route, the data processor 68 automatically positions the switches 180 and 182 to place the sum of two input signals on line 186 and one of the two input signals on line 184. Thus, this type of analysis may be performed automatically without any cumbersome setup. In addition, the user may instruct the instrument to configure itself for this type of analysis by simply inputting commands through the keypad 262.

Figure 9:
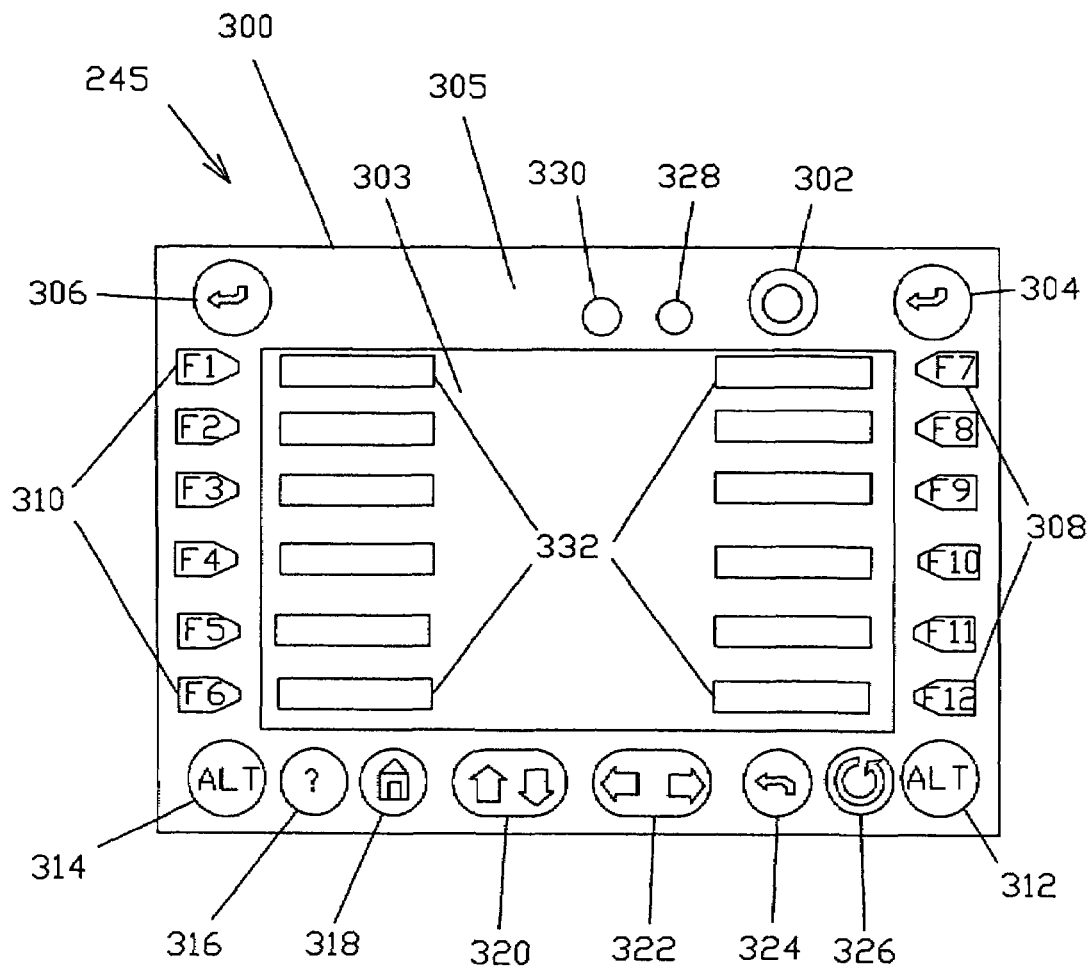
FIG. 9 is a diagram of the face of the invention detailing the position and size of the various buttons on the face in accordance with the present invention.

Referring now to FIG. 9, the interface between the user and the analyzer 245 is described. In FIG. 9, a face panel 300 is shown which includes a plurality of buttons, such as power button 302, positioned around a display 303. Since the analyzer 300 is used in very harsh conditions, such as factories, refineries, drilling platforms and power plants, the input for the analyzer must be extremely rugged. In this case, the display 303 is a ruggedized LCD display and all of the buttons, such as power button 302, are covered by a flexible membrane 305 that extends across all of the button area, which includes all of the area visible in FIG. 9 excluding the display 303. Thus, the membrane 305 seals and protects the entire button area from penetration by solids, liquids and gases such as dust, oil, and water vapor.

Enter buttons 304 and 306 are positioned in the upper right-hand corner and upper left-hand corner of the face panel 300, respectively. Below the enter button 304 is a row of function buttons 308, and below the enter button 306, there is a row of function buttons 310. In the lower right-hand and lower left-hand corners, alternate buttons 312 and 314 are provided. Buttons 304–314 are the most used buttons on the face panel 300 and are positioned and configured to be operated by the thumbs of the user. Thus, the buttons are almost as large as a typical thumb, and are separated by relatively large distances so that it is difficult to push two buttons at one time with a thumb. In addition, each button is defined by a raised perimeter represented by the lines defining the periphery of each button. This raised perimeter provides a distinct feel to the button and allows the user to center his or her thumbs in the center of the button. The raised perimeter of each button is sufficiently large that the perimeter can be felt through most work gloves and most protective gloves. Thus, the size and shape of the buttons provide a distinctive tactile feedback to the user.

By positioning the buttons 304–314 next to the left and right edges of the face panel 300, the analyzer 245 may be conveniently held between the palms of the user's hand and the buttons may be freely manipulated by the thumbs. As the buttons are depressed, different screens appear on the screen 303 and information is provided next to the buttons by information blocks 332. The blocks 332 typically inform the user as to the operation that would be performed if a function button 308 or 310 were depressed. After a button is depressed, the screen changes and the information blocks 332 also change. Thus, with each new screen shown on the display 303, the function of all the buttons 308–310 may change. In addition, the function button 332 may assume a different function, if either of the alternate buttons 312 or 314 are depressed.

Two alternate buttons 312 and 314 are provided so that either hand can push an alternate button. Thus if the user wishes to push one of the left-hand function buttons 310, and further desires to use the alternate function of that button, the user will depress the right-hand alternate button 312 and use his left hand to push one of the buttons 310. Likewise, if an alternative function of one of the right-hand buttons 308 is desired, the left hand depresses the alternate button 314 and the right hand depresses one of the right-hand buttons 308. When either of the alternate buttons 312 or 314 is depressed, the information blocks 332 change to display information as to the alternate function of the buttons 308 and 310.

The row of buttons 316–326 along the bottom of the face panel 300 are typically less used than the other buttons, but they are also conveniently located along an edge so that they too may be operated by a thumb, if desired. Thus, a user could hold the analyzer 245 with his left hand along the left side of the face panel 300 and his right hand along the bottom side of the panel 300. This configuration also provides the user with easy access to the buttons with his or her thumbs. Button 316 is a help button which accesses the help features of the analyzer, and button 318 is a home button which takes the user back to the main home page. Buttons 320 are up and down buttons and buttons 322 provide left and right functions. By use of these buttons, the user may move between displays and display positions in up, down, left and right movements. Button 324 is a back button that a user may use to access the previous screen, and button 326 is a reset button that is used to reset the analyzer 245 and restart the process. Two indicator lights 328 and 330 are provided to indicate the status of the analyzer 245.

What is claimed is:

1. An analyzer for monitoring parameters of a machine including machine vibration and for receiving an analog raw tachometer signal having a magnitude and a plurality of tachometer pulses having a cycle time corresponding to a speed of the machine, the raw tachometer signal including noise which may include spurious pulses, comprising:

a. a user input interface for receiving and transmitting a user input,
b. at least one analog input for receiving a raw analog signal having a magnitude,
c. a conditioning circuit connected to the analog input for receiving and processing the raw analog signal and producing a conditioned analog signal, the conditioned analog signal being produced from the raw analog signal based on predetermined criteria, the predetermined criteria including an input limit which is satisfied when the raw analog signal satisfies the input limit,
d. a data processor for receiving and processing the user input and controlling the analyzer based in part on the user input,
e. an output for producing an output signal at least in part corresponding to the conditioned analog signal,
f. the analog input including at least a tachometer input for receiving the raw tachometer signal,
g. the conditioning circuit including at least a qualifying circuit connected to the tachometer input for receiving and processing the raw tachometer signal and producing a qualified tachometer signal, the qualified tachometer signal being produced when the raw tachometer signal is qualified based on predetermined criteria for distinguishing between the tachometer pulses and spurious pulses, the qualified tachometer signal being produced in response to tachometer pulses not being produced in response to spurious pulses in the raw tachometer signal, and
h. the output for producing an output signal corresponding to the qualified tachometer signal.

2. The analyzer of claim 1, wherein the predetermined criteria include an amplitude criterion, the amplitude criterion being satisfied when the raw tachometer signal exceeds an amplitude threshold, the conditioning circuit producing a partially qualified tachometer signal corresponding to that portion of the raw tachometer signal that meets the amplitude criterion.

3. The analyzer of claim 2, wherein the predetermined criteria include a time criterion, the time criterion being satisfied when the partially qualified tachometer signal has a cycle time higher than a predetermined time limit.

4. The analyzer of claim 2, further comprising a microprocessor that implements the time criterion and produces tachometer signals that are modified based on the time criterion.

5. The instrument of claim 1, further comprising:
a. a circuit producing a comparison signal having a magnitude representing one of the predetermined criteria; and
b. an adjustable discriminator for receiving the comparison signal and the raw tachometer signal, comparing the magnitudes of the two received signals, and transmitting a partially qualified tachometer signal if the raw tachometer signal magnitude is greater than the comparison signal magnitude.

6. An analyzer for monitoring parameters of a machine including machine vibration, comprising:
a. a user input interface for receiving and transmitting a user input,
b. at least one analog input for receiving a raw analog signal having a magnitude,
c. a conditioning circuit connected to the analog input for receiving and processing the raw analog signal and producing a conditioned analog signal, the conditioned analog signal being produced from the raw analog signal based on predetermined criteria, the predetermined criteria including an input limit which is satisfied when the raw analog signal is below the input limit, the conditioning circuit having a selectable attenuator circuit for attenuating the raw analog signal when the input limit is exceeded,
d. a data processor for receiving and processing the user input and controlling the analyzer based in part on the user input, implementing the predetermined criteria, controlling the selectable attenuator circuit, and performing analysis of the conditioned analog signal,
e. an output for producing an output signal at least in part corresponding to the conditioned analog signal.

7. The analyzer of claim 6, wherein:
a. the conditioning circuit includes a memory storing a preset gain and a variable gain amplifier circuit for amplifying signals based on the preset gain,
b. the data processor includes a data processor memory,
c. the user input includes a route that is stored in the data processor memory, the route identifying a plurality of machines and a preset gain for each machine,
d. the data processor sets the gain of the variable gain amplifier circuit based on the preset gains stored in the memory.

8. The analyzer of claim 6, further comprising:
a. a second analog input for receiving a second raw analog signal having a second magnitude, and
b. a second conditioning circuit connected to the second analog input for receiving and processing the second raw analog signal and producing a second conditioned analog signal based on a second predetermined criteria, the second predetermined criteria including a second input limit which is satisfied when the second raw analog signal is below the input limit, the second conditioning circuit having a second selectable attenuator circuit for attenuating the second raw analog signal when the second input limit is exceeded,
c. the data processor implementing the second predetermined criteria, controlling the second selectable attenuation circuit, and performing analysis of the second conditioned analog signal,
d. the output producing the output signal corresponding to at least one of the conditioned analog signal and the second conditioned analog signal.

9. The analyzer of claim 6, further comprising:
a. a second analog input for receiving a second raw analog signal having a second magnitude,
b. a second conditioning circuit connected to the second analog input for receiving and processing the second raw analog signal and producing a second conditioned analog signal based on a second predetermined criteria, the second predetermined criteria including a second input limit which is satisfied when the second raw analog signal is below the input limit, the second conditioning circuit having a second selectable attenuator circuit for attenuating the second raw analog signal when the second input limit is exceeded, and
c. a summing circuit for receiving the conditioned analog signal and the second conditioned analog signal, producing a summation signal, the summation signal corresponding to the addition of the conditioned analog signal and the second conditioned analog signal, and transmitting the summation signal, d. the data processor implementing the second predetermined criteria, controlling the second selectable attenuation circuit, and performing analysis of the second conditioned analog signal, e. the output producing the output signal corresponding to at least one of the conditioned analog signal and the second conditioned analog signal.

10. The analyzer of claim 6, further comprising:

a. a tachometer input for receiving a raw tachometer signal having a magnitude and a plurality of pulses having a cycle time corresponding to a speed of a machine and b. a qualifying circuit connected to the tachometer input for receiving and processing the raw tachometer signal and producing a qualified tachometer signal, the qualified tachometer signal being produced when the raw tachometer signal is qualified based on a tachometer predetermined criteria, and c. the output producing the output signal based on the qualified tachometer signal and the conditioned analog signal.

11. An analyzer for monitoring parameters of a machine including machine vibration comprising:

a. a user input interface for receiving and transmitting a user input, b. at least one analog input for receiving a raw analog signal having a magnitude, c. a conditioning circuit connected to the analog input for receiving and processing the raw analog signal and producing a conditioned analog signal, the conditioned analog signal being produced when the raw analog signal is conditioned based on predetermined criteria, the predetermined criteria including a machine amplitude criterion, the machine amplitude criterion being part of the user input and corresponding to a predetermined amplifier gain, the predetermined amplifier gain corresponding to the machine and being stored in a memory, d. a data processor for receiving and processing the user input and controlling the analyzer based in part on the user input, implementing the predetermined criteria, selecting and implementing the predetermined amplifier gain based on the user in put, and performing analysis of the conditioned analog signal, and e. an output for producing an output signal corresponding to at least the conditioned analog signal.

12. The analyzer of claim 11, further comprising:

a. a second analog input for receiving a second raw analog signal having a second magnitude, and b. a second conditioning circuit connected to the second analog input for receiving and processing the second raw analog signal and producing a second conditioned analog signal based on a second predetermined criteria, the second predetermined criteria including a second machine amplitude criterion, the second machine amplitude criterion being part of the user input and corresponding to a second predetermined amplifier gain, the second predetermined amplifier gain corresponding to the machine and being stored in the memory, c. the data processor selecting and implementing the second predetermined amplifier gain based on the user input, and performing analysis of the second conditioned signal, and d. the output producing the output signal corresponding to at least one of the conditioned analog signal and the second conditioned analog signal.

13. The analyzer of claim 11 further comprising:

a. a second analog input for receiving a second raw analog signal having a second magnitude, b. a second conditioning circuit connected to the second analog input for receiving and processing the second raw analog signal and producing a second conditioned analog signal based on a second predetermined criteria, the second predetermined criteria including a second machine amplitude criterion, the second machine amplitude criterion being part of the user input and corresponding to a second predetermined amplifier gain, the second predetermined amplifier gain corresponding to the machine and being stored in the memory, and c. a summing circuit for receiving the conditioned analog signal and the second conditioned analog signal, producing a summation signal, the summation signal corresponding to the addition of the conditioned analog signal and the second conditioned analog signal, and transmitting the summation signal, d. the data processor selecting and implementing the second predetermined amplifier gain based on the user input, and performing analysis of the second conditioned signal, and e. the output producing the output signal corresponding to at least one of the conditioned analog signal and the second conditioned analog signal.

14. The analyzer of claim 11 further comprising:

a. a tachometer input for receiving a raw tachometer signal having a magnitude and a plurality of pulses having a cycle time corresponding to a speed of a machine and b. a qualifying circuit connected to the tachometer input for receiving and processing the raw tachometer signal and producing a qualified tachometer signal, the qualified tachometer signal being produced when the raw tachometer signal is qualified based on a tachometer predetermined criteria, wherein:

c. the output produces the output signal based on at least one of the qualified tachometer signal and the conditioned analog signal.

15. The analyzer of claim 11, further comprising a housing having a user input interface having a plurality of buttons for receiving and transmitting the user input, the housing having a left gripping surface and a right gripping surface situated such that at least some of the buttons are thumb accessible while the analyzer is held with palms of a user engaging the left and right gripping surfaces.

16. An analyzer for monitoring a machine comprising:

a. a user input interface for receiving and transmitting a user input, b. a first analog input for receiving a first raw analog signal having a first magnitude, c. a second analog input for receiving a second raw analog signal having a second magnitude, d. a first conditioning circuit connected to the first and second analog inputs for receiving and processing the first and second raw analog signals and producing a first conditioned analog signal, the first conditioned analog signal being produced from at least one of the first and second raw analog signals based on a first predetermined criteria, the first predetermined criteria including a first machine amplitude criterion, the first machine amplitude criterion being part of the user input and corresponding to a predetermined first channel amplifier gain, the predetermined first channel amplifier gain being stored in a memory, e. a second conditioning circuit connected to the first and second analog inputs for receiving and processing the first and second raw analog signals and producing a second conditioned analog signal, the second conditioned analog signal being produced from at least one of the first and second raw analog signals based on a second predetermined criteria, the second predetermined criteria including the second machine amplitude criterion, the second machine amplitude criterion being part of the user input and corresponding to a predetermined second channel amplifier gain, the predetermined second channel amplifier gain being stored in the memory, f. a data processor for receiving and processing the user input and controlling the analyzer based in part on the user input, implementing the predetermined criteria, which includes, selecting and implementing the predetermined first channel amplifier gain and the predetermined second channel amplifier gain, and performing analysis based on the first and second conditioned analog signals, and g. an output for producing an output signal corresponding to at least one of the first and second conditioned analog signals.

17. The analyzer of claim 16 further comprising a summing circuit for receiving the first conditioned analog signal and the second conditioned analog signal, producing a summation signal, the summation signal corresponding to the addition of the first conditioned analog signal and the second conditioned analog signal, and transmitting the summation signal.

18. The analyzer of claim 16 further comprising:
a. a tachometer input for receiving a raw tachometer signal having a magnitude and a plurality of pulses having a cycle time corresponding to a speed of a machine and
b. a qualifying circuit connected to the tachometer input for receiving and processing the raw tachometer signal and producing a qualified tachometer signal, the qualified tachometer signal being produced when the raw tachometer signal is qualified based on a tachometer predetermined criteria, wherein
c. the output produces the output signal further based on the qualified tachometer signal.

19. The analyzer of claim 16, further comprising a housing having a user input interface having a plurality of buttons for receiving and transmitting the user input, the housing having a left gripping surface and a right gripping surface situated such that at least some of the buttons are thumb accessible while the analyzer is held with palms of a user engaging the left and right gripping surfaces.

20. An analyzer for monitoring a machine comprising:
a. a user input interface for receiving and transmitting a user input,
b. a first analog input for receiving a first raw analog signal having a first magnitude,
c. a second analog input for receiving a second raw analog signal having a second magnitude,
d. a first conditioning circuit connected to the first and second analog inputs for receiving and processing at least one of the first and second raw analog signals and producing a first conditioned analog signal, the first conditioned analog signal being produced from at least one of the first and second raw analog signals based on a first predetermined criteria,
e. a second conditioning circuit connected to the first and second analog inputs for receiving and processing at least one of the first and second raw analog signals and producing a second conditioned analog signal, the second conditioned analog signal being produced from at least one of the first and second raw analog signals based on a second predetermined criteria,
f. a summing circuit for receiving the first and second conditioned signals, producing a summation signal, the summation signal corresponding to the addition of the first and second conditioned signals, and transmitting the summation signal,
g. a data processor for receiving and processing the user input and controlling the analyzer based in part on the user input, implementing the predetermined criteria, which includes receiving and interpreting the user input and based on the user input, and performing analysis of the summation signal, and
h. an output for producing an output signal corresponding to at least the summation signal.

21. The analyzer of claim 20, further comprising:
a. a tachometer input for receiving a raw tachometer signal having a magnitude and a plurality of pulses having a cycle time corresponding to a speed of a machine and
b. a qualifying circuit connected to the tachometer input for receiving and processing the raw tachometer signal and producing a qualified tachometer signal, the qualified tachometer signal being produced when the raw tachometer signal is qualified based on a tachometer predetermined criteria, wherein
c. the output produces the output signal further based on the qualified tachometer signal.

22. The analyzer of claim 20, further comprising a housing having a user input interface having a plurality of buttons for receiving and transmitting the user input, the housing having a left gripping surface and a right gripping surface situated such that at least some of the buttons are thumb accessible while the analyzer is held with palms of a user engaging the left and right gripping surfaces.

* * * * *